US007854400B2

(12) United States Patent
Stier

(10) Patent No.: US 7,854,400 B2
(45) Date of Patent: Dec. 21, 2010

(54) FUEL INJECTOR

(75) Inventor: Hubert Stier, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 543 days.

(21) Appl. No.: 11/217,516

(22) Filed: Aug. 31, 2005

(65) Prior Publication Data

US 2006/0076439 A1 Apr. 13, 2006

(30) Foreign Application Priority Data

Sep. 28, 2004 (DE) ...................... 10 2004 047 041

(51) Int. Cl.
*F16K 31/02* (2006.01)

(52) U.S. Cl. ................ 239/585.1; 239/600; 251/129.21

(58) Field of Classification Search ............ 251/129.21, 251/129.15; 239/585.1, 600; 137/15.18
See application file for complete search history.

(56) References Cited

U.S. PATENT DOCUMENTS 4,722,460 A * 2/1988 Madsen ...................... 251/308
5,516,424 A * 5/1996 Strohschein ................ 239/575
5,996,910 A * 12/1999 Takeda et al. ............ 239/585.1
5,996,911 A * 12/1999 Gesk et al. ............. 251/129.21
6,012,655 A * 1/2000 Maier ...................... 239/585.1
6,019,347 A * 2/2000 Adams et al. .......... 251/129.21
6,042,082 A * 3/2000 Graner et al. .......... 251/129.21
6,186,472 B1 * 2/2001 Reiter ................... 251/129.21
6,257,509 B1 * 7/2001 Hafner et al. ............ 239/585.1
6,299,079 B1 * 10/2001 Noller et al. ................ 239/600
6,382,532 B1 * 5/2002 French et al. ............ 239/585.1
6,390,392 B1 * 5/2002 Reiter ..................... 239/585.1
6,679,435 B1 * 1/2004 Noller et al. ........... 251/129.21
2001/0045473 A1 11/2001 Landschoot et al.
2002/0084362 A1 7/2002 Dallmeyer et al.
2003/0127544 A1 * 7/2003 Demere et al. ........... 239/585.1
2003/0146308 A1 * 8/2003 Yamashita ............... 239/585.1
2003/0155448 A1 * 8/2003 Reiter et al. ............. 239/585.1

FOREIGN PATENT DOCUMENTS

DE 196 31 280 2/1998
DE 101 22 353 11/2002
EP 1 219 820 7/2002
EP 1429019 A1 * 6/2004

* cited by examiner

*Primary Examiner*—John Bastianelli
(74) *Attorney, Agent, or Firm*—Kenyon & Kenyon LLP

(57) ABSTRACT

A fuel injector for an internal combustion engine includes a solenoid coil which is actuable by an electrical line, a valve sleeve which forms an outer coat of the fuel injector in a discharge-side region, and a valve housing. The fuel injector further includes a plastic sleeve, which houses the solenoid coil and the electrical line. The plastic sleeve is slid over the valve sleeve in assembly. The plastic sleeve has two parts interconnected by a crosspiece, with a recess formed in a radial region adjacent to the region of the crosspiece.

14 Claims, 3 Drawing Sheets

FUEL INJECTOR

FIELD OF THE INVENTION

The present invention relates to a fuel injector having a plastic sleeve that includes a solenoid coil.

BACKGROUND INFORMATION

Fuel injectors generally have a number of metallic housing components which are provided with a plastic extrusion coat after assembly. Such a fuel injector is described in, e.g., published German patent document DE 101 22 353.

A fuel injector for fuel-injection systems which is made up of two main components is described in, e.g., published German patent document DE 196 31 280. An inner valve part encompasses all individual components that lie along the direct flow path of the fuel, while an outer plastic component is formed mainly by a solenoid coil subassembly and a plastic coat. After adjustment, the valve component is inserted in a feed-through opening of the plastic part.

A particular disadvantage of the known fuel injectors, such as those exemplified above, is that the manufacture and assembly of such fuel injectors are labor-intensive and thus costly.

SUMMARY OF THE INVENTION

The fuel injector according to the present invention has the advantage that the plastic extrusion coat of the fuel injector's outer coat is provided in the form of a prefabricated plastic sleeve which encompasses the electrical parts of the solenoid circuit, i.e., the solenoid coil, the electrical line and the plug-in connection, in two plastic parts connected by a cross-piece. A recess allows simple installation and affixation of the plastic sleeve on the valve subassembly.

This arrangement enables faster assembly in fewer working steps, and the labor-intensive and often faulty plastic extrusion coat may be dispensed with.

It is also advantageous that the plastic sleeve is easy to slide onto the valve sleeve and is able to be fixed in place by a top that can be inserted radially into the recess of the plastic sleeve. A collar of the valve sleeve prevents axial sliding of the plastic sleeve.

It is also advantageous that the top has the shape of a circle segment with an angular expansion of at least 180°.

DETAILED DESCRIPTION

Figure 1:
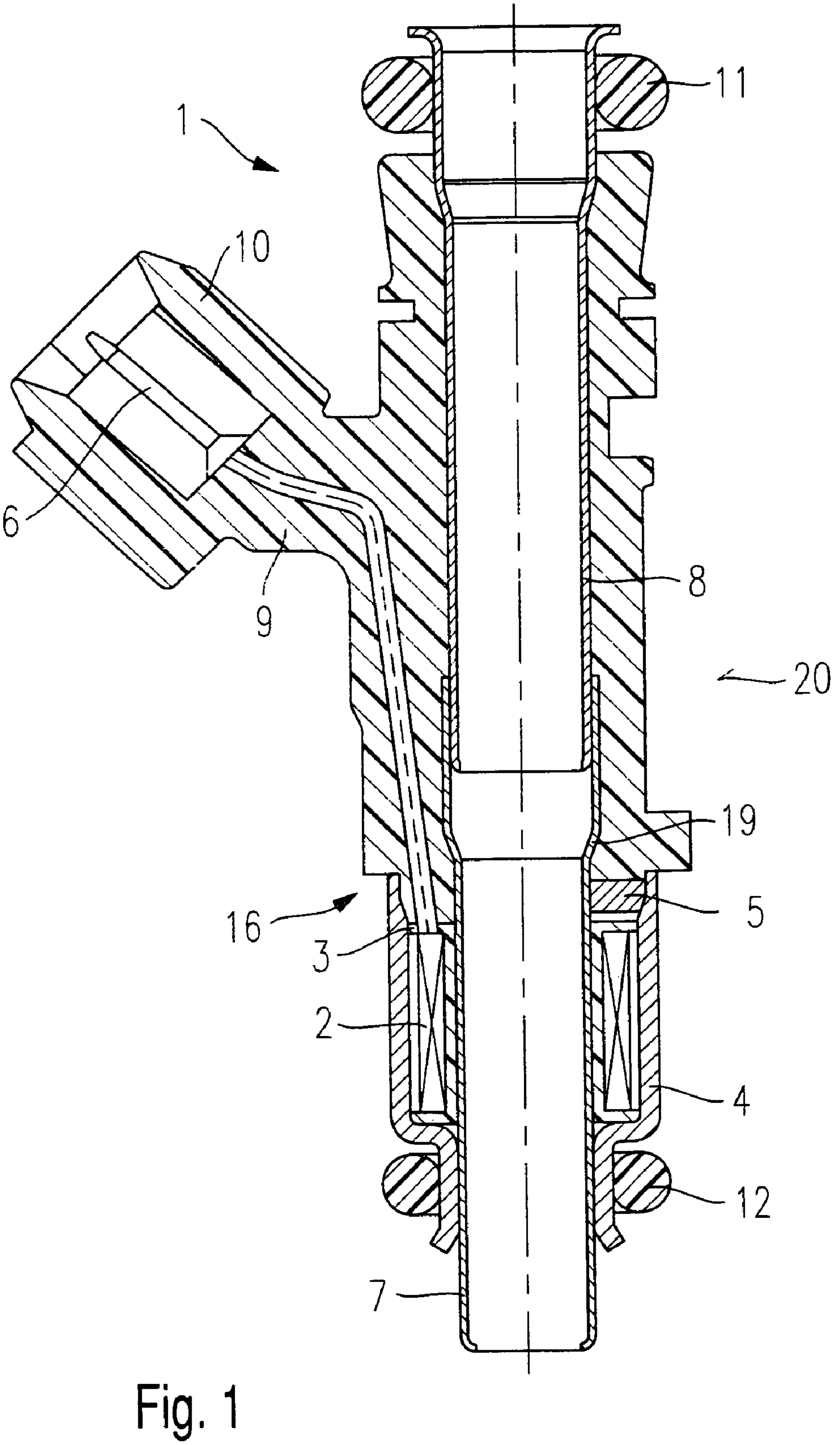
Fig. 1 PRIOR ART
FIG. 1 shows a schematic cross-sectional view of a conventional fuel injector.

FIG. 1 shows a schematic cross-sectional view of major components of a conventional fuel injector 1. Fuel injector 1 may be used for injection of fuel into an intake manifold (which is not shown further) of an internal combustion engine, for example.

Fuel injector 1 includes a solenoid coil 2 which is wound on a coil brace 3. Coil brace 3 is encapsulated in a valve housing 4 which serves as outer pole of solenoid coil 2, and is sealed by a top 5. Solenoid coil is contacted via an electrical line 6. Coil brace 3 is penetrated by a valve sleeve 7 which has a tubular design and is extended in the direction of the fuel line by an insertion sleeve 8. Valve sleeve 7 and insertion sleeve 8 form an outer coat 20 of fuel injector 1.

The assembly of fuel injector 1 shown in FIG. 1 is carried out in such a way that valve sleeve 7 is produced first, and the components solenoid coil 2, valve housing 4 and top 5 are axially slid over valve sleeve 7 (or outer coat 20) of fuel injector 1. Once the metallic components of fuel injector 1 have been pre-assembled, a plastic-extrusion coat 9 is injection-molded onto outer coat 20. It includes a plug 10 to connect the electrical line (not shown further) for solenoid coil 2. Due to the type of assembly, a joint is formed between plastic-extrusion coat 9 and the metallic components of fuel injector 1 in the area designated by reference numeral 16.

Continuing with FIG. 1, on the inflow side, a gasket 11 seals fuel injector 1 against a fuel distributor line (not shown further), and another gasket 12 seals fuel injector 1 against the intake manifold of the internal combustion engine.

Fuel injector 1 may be activated in the conventional manner via an armature that cooperates with solenoid coil 2, in conjunction with a valve needle whose valve-closure member seals the spray-discharge orifices. The spray-discharge orifices are opened by lifting the valve needle and closed by the renewed lowering of the valve needle, e.g., with the aid of a restoring spring. The corresponding components are not shown further in the figures for the sake of maintaining clarity.

Figure 2A:
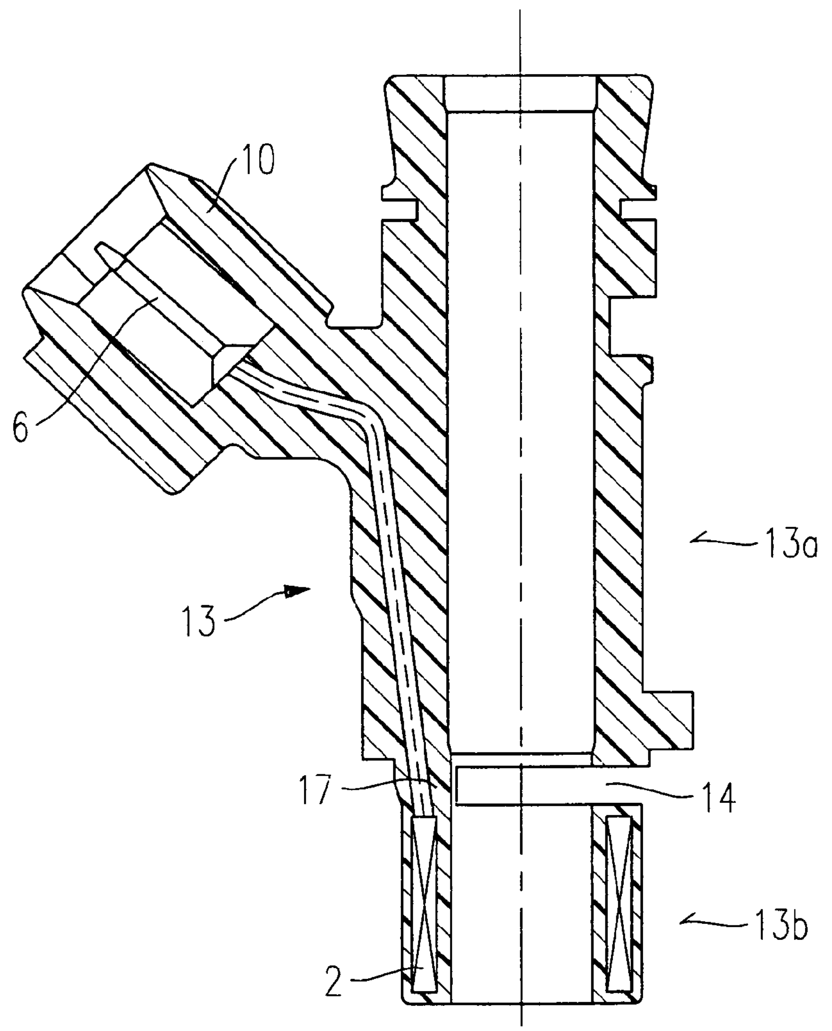
FIG. 2A shows a schematic cross-sectional view of a plastic sleeve of an exemplary embodiment of a fuel injector according to the present invention.
Figure 2B:
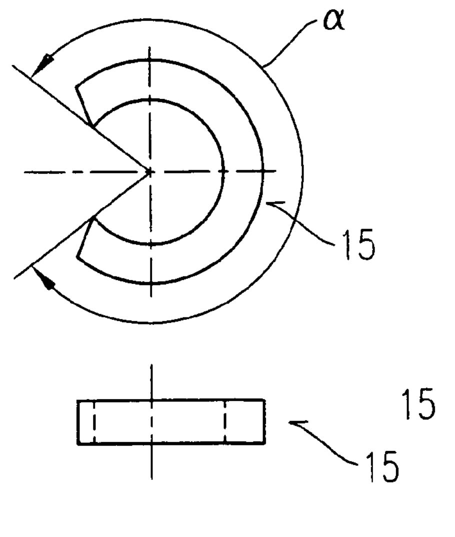
FIG. 2B shows two related views of a top to be inserted into the plastic sleeve illustrated in FIG. 2A.
Figure 3:
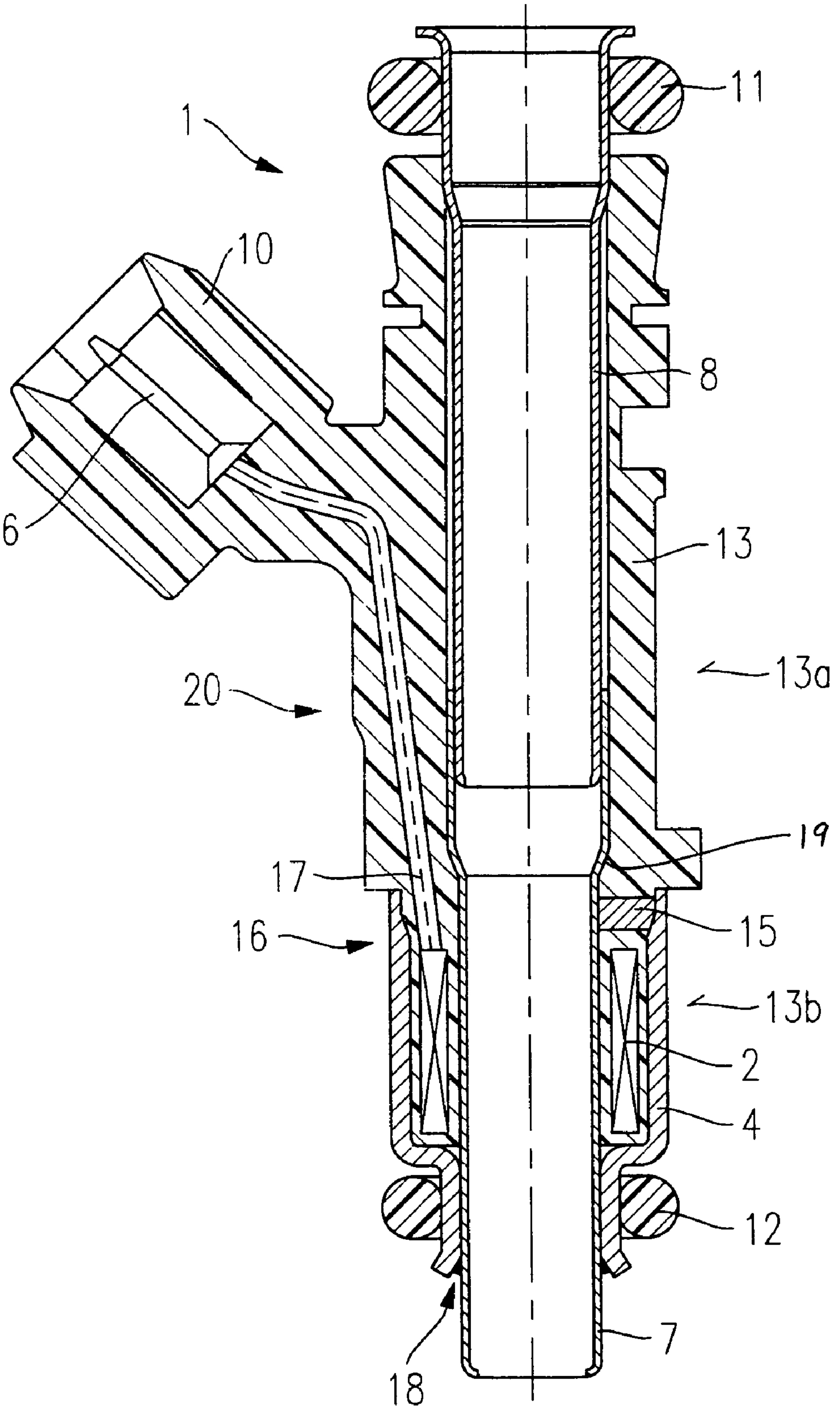
FIG. 3 shows a schematic cross-sectional view of the fully assembled fuel injector according to an example embodiment of the present invention.

According to an example embodiment of the present invention, which is schematically shown in FIGS. 2A, 2B and 3, the installation of fuel injector 1 is greatly simplified in that a plastic sleeve 13 is produced which already includes solenoid coil 2 and electrical lines 6 required for the contacting, as well as plug 10, which will then be slid onto outer coat 20 of fuel injector 1 in the region of valve sleeve 7 and insertion sleeve 8 in an additional assembly step. In this manner, the individual assembly of the components solenoid coil 2, electrical lines 6 and top 5 (shown in FIG. 1) is dispensed with, as is the subsequent plastic extrusion coating.

Sleeve 13 is shown schematically in FIG. 2A. It already includes pre-molded plug 10, electrical lines 6 and solenoid coil 2. On the inflow side of solenoid 2 a recess 14 is formed which subdivides plastic sleeve 13 into two parts 13*a* and 13*b*, which parts are interconnected by a crosspiece 17. Electrical lines 6 for the contacting of solenoid coil 2 extend through crosspiece 17.

A top 15 which has the form of a circular segment is provided for the further assembly of fuel injector 1, as shown in FIG. 2B. Top 15 is formed such that it extends across an angular range $\alpha$ of at least 180°, and optionally greater than 180°. Suitable material selection ensures that top 15 is elastic and able to be clipped radially over outer coat 20 of fuel injector 1 in the region of valve sleeve 7 during assembly, notwithstanding the angular expansion of more than 180°. FIG. 2B shows top 15 in a schematic representation of a top view and a side view.

The assembly according to an example embodiment of the present invention includes the following steps: a) sliding plastic sleeve 13 onto valve sleeve 7 provided with insertion sleeve 8; b) radial insertion of top 15 into recess 14; and c) welding valve housing 4, slip-fitted last, to valve sleeve 7 via a welding seam 18. As an alternative, it is also possible to join plastic sleeve 13 to valve housing 4 in a form-fitting manner by crimping. In this manner, the valve sleeve 7 is fixed in plastic sleeve 13. Sliding in the axial direction is prevented by a collar 19 which is formed on valve sleeve 7, into which insertion sleeve 8 is inserted. The fully assembled injector is shown in FIG. 3. An extrusion-coat joint with a metallic component as in FIG. 1 no longer occurs in the region designated by reference numeral 16 in FIG. 3.

The present invention is not limited to the exemplary embodiment shown, and the present invention may be applied to any designs of fuel injectors, e.g., for fuel injectors for direct injection or fuel injectors connected to a common-rail system.

What is claimed is:

1. A fuel injector for a fuel-injection system of an internal combustion engine, comprising:

a solenoid coil configured to be actuated by an electrical line;

a valve sleeve which forms an outer coat of the fuel injector in a discharge-side region of the fuel injector;

a single piece integral plastic sleeve, made of one continuous plastic material, which houses the solenoid coil and the electrical line, wherein the plastic sleeve is slid over the valve sleeve; and a valve housing which is slid over the valve sleeve and a portion of the plastic sleeve housing the solenoid coil;

the valve housing circumferentially extending along an entire axial length of the solenoid coil;

wherein the plastic sleeve has two parts interconnected by a crosspiece;

wherein a recess is formed between the two parts in a region radially adjacent to the crosspiece;

wherein an inflow-side part of the plastic sleeve includes at least a portion of a plug;

wherein the solenoid coil is arranged in a discharge-side part of the plastic sleeve;

wherein the discharge-side part of the plastic sleeve is arranged between the valve sleeve and the valve housing; and wherein the electrical line extends through the crosspiece.

2. The fuel injector as recited in claim 1, wherein a top is radially inserted into the recess.

3. The fuel injector as recited in claim 2, wherein the top has the shape of a partial circular segment.

4. The fuel injector as recited in claim 3, wherein the partial circular segment extends across a radial angular range of at least 180°.

5. The fuel injector as recited in claim 2, wherein the valve sleeve is fixed in place in the plastic sleeve by the radial insertion of the top into the recess.

6. The fuel injector as recited in claim 5, wherein the valve sleeve has a collar that prevents axial displacement of the top.

7. The fuel injector as recited in claim 1, wherein the valve housing is fixed in place on the valve sleeve by a welded seam.

8. The fuel injector as recited in claim 1, wherein the valve housing is fixed in place on the valve sleeve by a welded seam.

9. The fuel injector as recited in claim 2, wherein the valve housing is fixed in place on the valve sleeve by a welded scam.

10. The fuel injector as recited in claim 6, wherein the valve housing is fixed in place on the valve sleeve by a welded seam.

11. The fuel injector as recited in claim 1, wherein the plastic sleeve is joined to the valve sleeve in a form-fitting manner by crimping.

12. The fuel injector as recited in claim 1, wherein the plastic sleeve is joined to the valve sleeve in a form-fitting manner by crimping.

13. The fuel injector as recited in claim 2, wherein the plastic sleeve is joined to the valve sleeve in a form-fitting manner by crimping.

14. The fuel injector as recited in claim 6, wherein the plastic sleeve is joined to the valve sleeve in a form-fitting manner by crimping.

* * * * *